3,077,373
SULFATION OF CELLULOSE
Ralph W. Kerr, Riverside, Ill., assignor to Corn Products Company, New York, N.Y., a corporation of Delaware
No Drawing. Filed Apr. 12, 1960, Ser. No. 21,618
5 Claims. (Cl. 8—120)

This invention relates to the preparation of sulfates of cellulose and its derivatives.

Sulfation of cellulose by several methods has been known for sometime but the resultant sulfates have never enjoyed any wide use in industry. One reason these products have not been commercially successful and have not enjoyed wider use is that they have not been available in non-degraded form, or have not been available in non-degraded form at a reasonable price. Prior art methods involved the use of strongly hydrolytic sulfating agents. In order to overcome hydrolytic effects it has been proposed to carry out the sulfation in a solvent medium, such as pyridine. Other anhydrous systems have also been employed in an attempt to minimize hydrolytic cleavage of the substrate. The cost of solvents and their recovery has added materially to the cost of the product. Sulfating agents used in the prior art, such as sulfuric acid, chlorosulfonic acid, sulfuryl chloride, and sulfur trioxide are either, or all, highly corrosive, volatile, toxic and even violently explosive. The high cost of equipment suitable for handling highly corrosive, volatile, toxic and explosive sulfating agents, and carrying out of complicated procedures with these reagents and solvents, have been the main deterrent in commercial production of sulfated cellulose.

I have discovered that sulfation of cellulose may be accomplished by a simple and economical method by treating the cellulose with a tertiary amine-sulfur trioxide compound in contact with water and an alkaline catalyst.

In general the reaction is represented as follows:

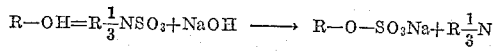

wherein ROH represents cellulose and wherein

represents any tertiary amine, such as, for example, trimethylamine, triethylamine, pyridine, etc., and wherein

is the crystalline compound formed by a reaction between said tertiary amine and sulfur trioxide, or compounds liberating sulfur trioxide, such as chlorosulfonic acid.

The sulfation may be carried out in an aqueous suspension or solution, or in the semi-dry state and without the use of any organic solvents. This discovery, that the crystalline compounds of sulfur trioxide and tertiary amines would sulfate cellulose in the presence of water is an unanticipated result which has led to very substantial savings in processes for the production of the aforementioned sulfate.

Although my invention covers the use of compounds of all tertiary amines and sulfur trioxide as sulfating agents, for reasons of economy, I prefer to use trimethylamine sulfur trioxide. Over-all higher economy is obtained with this reagent because (1) trimethylamine sulfur trioxide has the lowest molecular weight of reagents of this class; (2) its cost per pound is least; (3) under comparable conditions, sulfation is highest on a molar basis; and (4) the amine portion of the compound is a gas at room temperature and thus after the reaction, the liberated amine is more readily recoverable from the reaction mixture.

In the reaction, alkaline substances are used to promote the sulfation, displacing the amine from the compound and forming the alkali salt of the cellulose sulfate. Although for reasons of cost, sodium hydroxide is the preferred alkali, other alkalis or bases, such as, for example, potassium hydroxide, may be used. Particularly where the substrate is water soluble, e.g., hydroxyethyl cellulose, weaker bases, such as calcium hydroxide, may be employed.

The amount of alkali used may vary widely, for example, from about 10 to about 100 percent, based on the weight of the cellulose. The optimum proportion will depend primarily on the nature and physical state of the substrate. One function of alkali in promoting the sulfation is to open up the lattices of highly oriented and crystalline substrates in order to allow entry of sulfating agent into the crystallites. Where the substrate is non-associated or water dispersible considerably less alkali is required. However, when the intent is to produce the salt of the sulfated substrate directly, then preferably an amount of alkali not less than that equimolar to the sulfating agent should be used.

One of the important advantages of my process is that I am able to use relatively low cost alkalis, such as sodium hydroxide, whereas in prior art processes for the sulfation of cellulose, when a hydrogen acceptor was used, relatively large quantities of more expensive organic bases, such as amines have been employed, no doubt because of the hitherto prevailing belief that anhydrous conditions were a necessity.

Because of the alkalinity of the system, the cellulose undergoing sulfation in my process is entirely protected from degradation by acid hydrolysis.

Depending upon the purification procedures employed, the resulting product may be the alkali salt of the sulfuric acid half ester of the cellulose, as indicated in the equation above, or if an acid wash or other acid purification step is employed, the free half ester, R—OSO$_3$H, may result. Alternately, the product may be prepared as a salt of some cation other than an alkali metal, such as, for example, a copper salt of the sulfuric acid half ester of cellulose, or the quaternary ammonium salt of the sulfuric acid half ester of cellulose, by treating the cellulose sulfate with the appropriate base or salt.

The examples given in the following pages will additionally illustrate my invention, but they are in no manner intended to be limiting.

EXAMPLE 1

*Sulfation of Cellulose With Triethylamine Sulfur Trioxide*

Cellulose in fibrous form (surgical cotton) was sulfated as follows: Four grams was moistened with 60 grams of an aqueous solution which contained 15 grams of NaOH. After 1 hour at room temperature the excess alkali solution was squeezed out and the cotton washed until only 2 grams of the NaOH remained with the cotton. The cellulose fibers, now somewhat swollen by the alkali, were added to 150 ml. of water. Then 5 grams of crystalline triethylamine sulfur trioxide was added with agitation. The reaction mixture was placed in a 50° C. bath and agitated for 4 hours. The pH was 11.1.

The reaction mixture was adjusted to pH 7 by the addition of HCl. The cotton fiber product, now perceptibly stiffened, was extensively washed in deionized water and then dried. The purified cellulose sulfate weighed 4.09 grams and contained 0.51 percent sulfur or 1.5 percent sulfate ester groups.

EXAMPLE 2

The fibrous cellulose sulfate made in Example 1 was considerably stiffer than untreated cotton, and of a degree suitable for making stiffened fabrics such as organdy.

A sample of the cellulose sulfate made in Example 1 and one of untreated cotton were immersed for 2 minutes in a 0.1 percent solution of the basic dye, methylene blue. Both samples were extensively washed in water until the washes were colorless. The cellulose sulfate fibers were dyed an intense blue color whereas the nonsulfated cotton was substantially colorless.

Therefore, the advantages for using sulfation to prepare fibrous cotton for weaving stiffened textiles, such as organdies are twofold compared to the conventional method of using untreated cotton and starching the woven goods. These are, (1) sulfation, as outlined above, gives a stiffening effect which remains after washing in water and (2) sulfation gives an exceptional fastness to basic dyes; starching is removed in laundering and moreover tends to mask the natural appearance, or the color, of the dyed fabric.

EXAMPLE 3

*Preparation of Cellulose Sulfate by Reacting Cotton With Trimethylamine Sulfur Trioxide*

Twenty grams of surgical cotton was wet with 220 ml. of water in which had been dissolved 75 grams of sodium hydroxide. The mixture was allowed to stand at room temperature for 30 minutes. The treated cotton was then pressed on a Büchner funnel. It was found that the cotton had taken up 19.68 grams of NaOH. The treated cotton was allowed to stand at room temperature an additional 30 minutes and then was submerged in 600 ml. of water. Four moles of NaOH was present per molar weight of cellulose.

With stirring, 17.1 grams (one molar equivalent to cotton) of crystalline trimethylamine sulfur trioxide was added in small portions as the temperature was raised to 50° C. The reaction mixture was stired at 50° C. for 4 hours at which time the odor of amine, very strong at first, was substantially nil.

The treated cotton was filtered and pressed on a suction filter and washed on the filter with two 250 ml. portions of water. The product was suspended in 500 ml. of water, adjusted to pH 7 by adding HCl and again filtered and washed on the suction filter, with pressing, with two 250 ml. portions of water.

The product was suspended in 500 ml. of water and allowed to stand overnight. The pH was 6.7. Again the product was filtered and washed as above described and air dried; weight=21.6 grams. Analysis of the cellulose sulfate showed 0.82 percent sulfur or 2.46 percent sulfate groups.

EXAMPLE 4

A small sample of the cellulose sulfate made in Example 3 was added to a 0.1 percent aqueous solution of the basic dye, methylene blue. After stirring for about 2 minutes, the dyed cellulose sulfate was washed with copious quantities of distilled water. The washed cellulose sulfate which had been dyed was still an intense blue shade. Untreated cotton, similarly treated with methylene blue and washed, was substantially colorless in comparison. These results shown that a sufficient number of acidic sulfate groups had been introduced into the cellulose molecule to hold, by chemical union, a basic dye.

The above results show that when cellulose in fibrous form, such as in cotton yarns and fabrics or in paper pulp, or rayon, are sulfated by this process, materially better fastness is obtained when these sulfated fibers are dyed with basic dyes.

When the sulfated cotton was dyed by treating with a 0.1 percent aqueous solution of an acidic dye, Light Green, S.F., and washed with water, the product was substantially colorless.

When washed, white wool fibers and when a cotton fiber made cationic by treatment with ethyleneimine were treated with acidic dye, sold under the name Light Green, S.F., both of these basic fibers were dyed a fast green shade. However, when the two basic fibers were treated with the basic dye, methylene blue, and washed, they were both substantially colorless.

The above results show that by sulfation of cotton or other cellulosic yarns, e.g., rayon, and by weaving these sulfated yarns with untreated yarns or with yarns of basic nature or basically derivatized, e.g., ethyl amino cellulose, and that by dying the woven fabric with selected basic and/or acidic dyes, novel colored designs may be produced in the woven fabric, owing to the fact that the sulfated yarns take up readily and preferentially the basic dye, but not an acidic dye and that the untreated yarns, or basic yarns will not readily hold the basic dye but can be induced, especially the basic yarns, to take up the acidic dye.

EXAMPLE 5

A portion of the product of Example 3 was converted into the acid sulfuric acid ester as follows: Six grams of the cellulose sulfate (sodium salt) was stirred in 200 ml. of water. The pH of 6.7 was reduced to pH 1.5 by adding 10.2 ml. of normal HCl. After 30 minutes at room temperature, the product was squeezed dry, washed by stirring and squeezing in running distilled water for an hour and then suspended in 500 ml. of water. After 24 hours, glass electrodes in the water phase gave a pH reading of 5.1; when the cotton product was in contact with both electrodes, the pH reading was 2.9.

The product was suction filtered, by pressing, and air dried. Weight=6 grams.

The acid ester was examined for cation-exchange capacity as follows: One gram of the cellulose sulfate was immersed in 50 ml. of water in which were placed the glass electrodes of a Beckman pH meter. Then with stirring, M/20 $Na_2CO_3$ solution was added dropwise until the pH reading was 9.3 and remained at that value for 10 minutes. It was found that 6.45 ml. of M/20 $Na_2CO_3$ was required, which is equivalent to a cation-exchange capacity of 645 milliequivalents per kilogram. This value compares with a value of about 500 milliequivalents per kilogram obtained with an alkyl sulfate cellulose ether having 1.7 percent sulfur content (Guthrie et al., U.S. Patent 2,681,846 (1954)).

EXAMPLE 6

*Preparation of Cellulose Sulfate by Reacting Cotton With Crystalline Pyridine Sulfur Trioxide*

Four grams of surgical cotton was placed into 45 ml. of water into which had been dissolved 15 grams of NaOH for 30 minutes at room temperature after which it was filtered with suction and by pressure on the cotton.

It was found that the cotton had taken up 3.93 grams of NaOH or a ratio of 4 moles of NaOH per molar weight of cellulose. After standing an additional 30 minutes at room temperature, the treated cotton was added to 120 ml. of water and while stirring and heating to 45° C., 4.9 grams of white, crystalline pyridine sulfur trioxide was added.

After 5 hours at 45° C. the cotton product was filtered with pressing and washed on the filter with two 50-ml. portions of water. The product was resuspended in 100 ml. of water, adjusted to pH 7.0 with HCl, filtered with pressing and washed on the filter with two 50 ml. portions of water. Finally, the product was stirred for 2 hours in 200 ml. of water, filtered with pressing and washed on the filter with two 50 ml. portions of water. The product was air dried. On analysis it was found to contain 0.15 percent sulfate groups. The cellulose sulfate stained blue with methylene blue when treated by the procedure given in Example 3.

EXAMPLE 7

*Sulfation of a Cotton Fabric With Triethylamine Sulfur Trioxide*

Sixteen grams of a woven cotton fabric was sulfated by the procedures given in Example 3, leaving 2 grams of NaOH with the fabric and adding 3 grams of crystalline triethylamine sulfur trioxide. After neutralization and purification of the product by washing, a sample of the product analyzed 0.30 percent sulfur.

The product was materially stiffened compared to the untreated fabric and showed increased fasteness to the basic dye, methylene blue.

EXAMPLE 8

Sulfation of Alpha-Cellulose

Purified paper pulp, made from wood and often referred to as alpha-cellulose, was sulfated in fibrous, water insoluble form by procedures substantially as given for cotton in Example 3, with substantially the same results.

EXAMPLE 9

Sulfation of a Cellulose Derivative, Methyl Cellulose

Ten grams of methyl cellulose (D.S.=1.8, as methoxyl and medium solution viscosity) was stirred into 200 ml. of water at 90° C. until the methyl cellulose was thoroughly dispersed. Then 300 ml. of cold water was added followed by 20 ml. of N NaOH with stirring. As the reaction mixture was held at about 40° C., 2.25 grams of crystalline triethylamine sulfur trioxide was added over a period of about 15 minutes. Thereupon, 20 ml. of N NaOH and 2.25 grams of crystalline triethylamine sulfur trioxide were added in the same manner as were the first additions. The reaction mixture was stirred at 40° C. for a total of 5 hours. The reaction mixture, now a clear solution, had a pH value of 11. It was neutralized to pH 7.0 by adding about 5 ml. of N HCl. The neutralized solution was dialyzed against deionized water to purify the methyl cellulose sulfate and the purified product was recovered in dry form by lyophilizing. 9.5 grams of product was obtained, which was found to contain 5.2 percent sulfur, dry basis, indicating 15.5 percent sulfate groups had been introduced into the cellulose molecule.

From the yield of product obtained, it is obvious that very little carbohydrate was lost during the dialysis step, which shows that the cellulose was not materially degraded during sulfation.

Over-all reaction efficiency was calculated to be about 62 percent, on the basis that 4.5 grams of the triethylamine sulfur trioxide supplied 0.8 gram of sulfur, and that about 0.5 gram sulfur (as sulfate) could be accounted for in the recovered product.

This application is a continuation-in-part of application Serial No. 562,670, filed February 1, 1956, now abandoned.

I claim:

1. A process for sulfating cellulose, cellulose derivatives containing at least one free hydroxyl group and mixtures thereof which comprises pre-treating said cellulosic substance with at least about 10 percent by weight of said cellulosic substance of an alkaline substance selected from the group consisting of sodium hydroxide, potassium hydroxide and calcium hydroxide for a time sufficient to open up the lattices of molecules of said cellulosic substance and reacting said pre-treated cellulosic substance with a sulfur trioxide-tertiary amine compound in an aqueous medium.

2. Process according to claim 1 wherein the tertiary amine in said compound is trimethylamine.

3. Process according to claim 1 wherein the tertiary amine in said compound is triethylamine.

4. Process according to claim 1 wherein the tertiary amine in said compound is pyridine.

5. A process for improving cellulose materials to increase their receptivity and fastness to basic dyes and to decrease receptivity to acid dyes in textile yarns and fabrics and increase the stiffness of women fabric which comprises treating cellulose in fibrous form with at least about 10 percent by weight of said cellulose of an alkaline substance selected from the group consisting of sodium hydroxide, potassium hydroxide, and calcium hydroxide for a time sufficient to open up the lattices of molecules of said cellulose, removing the excess of said alkaline substance and reacting a sulfur trioxide-tertiary amine compound with said treated cellulose in an aqueous medium.

References Cited in the file of this patent

UNITED STATES PATENTS

| 2,025,073 | Rigby | Dec. 24, 1935 |
| 2,402,647 | Lecher et al. | June 25, 1946 |
| 2,697,093 | Jones | Dec. 14, 1954 |
| 2,786,833 | Wurzburg et al. | Mar. 26, 1957 |

OTHER REFERENCES

Guthrie: Industrial and Engineering Chem., vol. 44, September 1952, pages 2187–2189.

UNITED STATES PATENT OFFICE
CERTIFICATE OF CORRECTION

Patent No. 3,077,373                                                                 February 12, 1963

Ralph W. Kerr

It is hereby certified that error appears in the above numbered patent requiring correction and that the said Letters Patent should read as corrected below.

Column 6, line 25, for "women" read -- woven --.

Signed and sealed this 3rd day of September 1963.

(SEAL)
Attest:

ERNEST W. SWIDER
Attesting Officer

DAVID L. LADD
Commissioner of Patents